Jan. 1, 1935.  J. BROWN  1,986,182
DISTRIBUTION SYSTEM
Filed Aug. 27, 1929   2 Sheets-Sheet 1
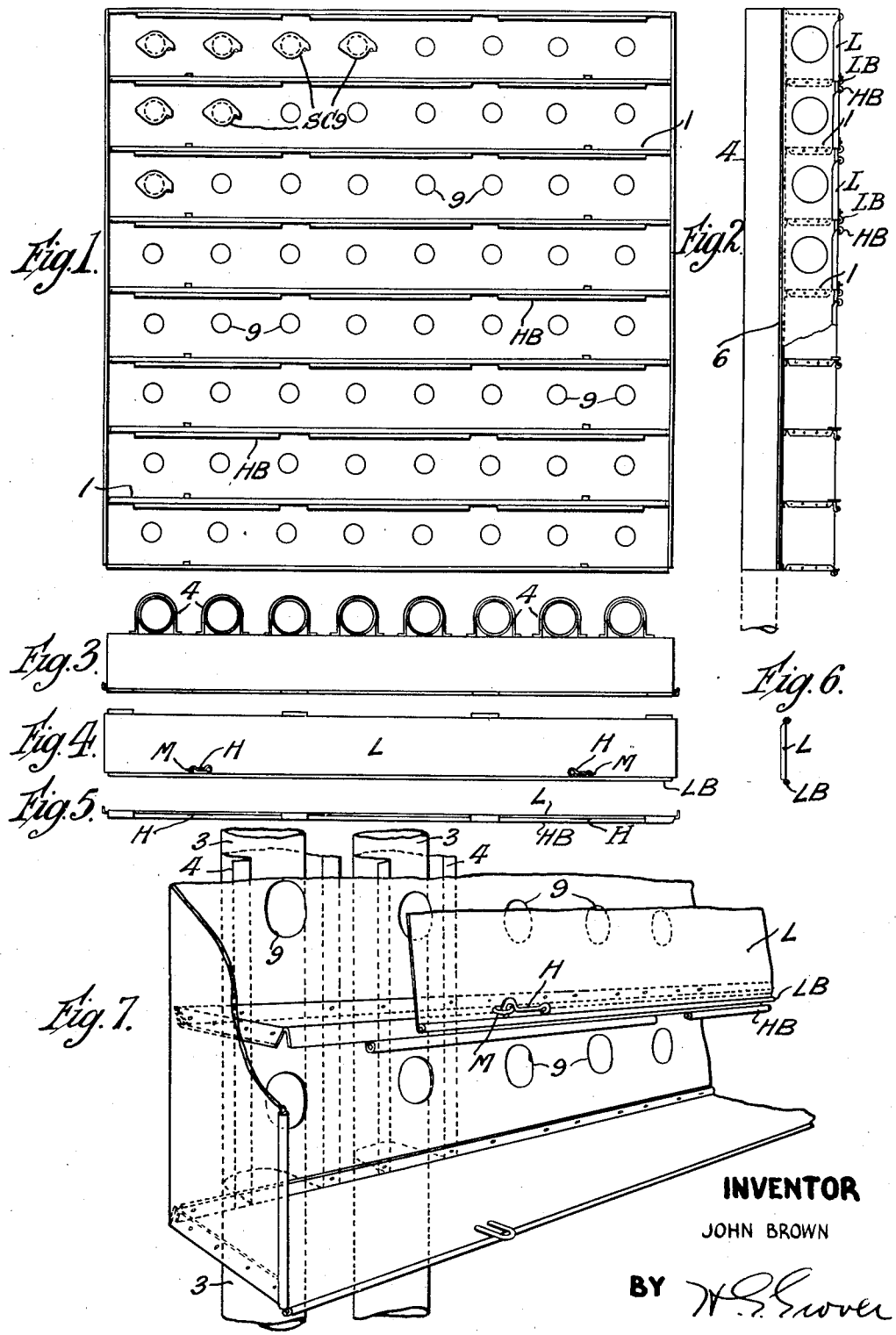
INVENTOR
JOHN BROWN

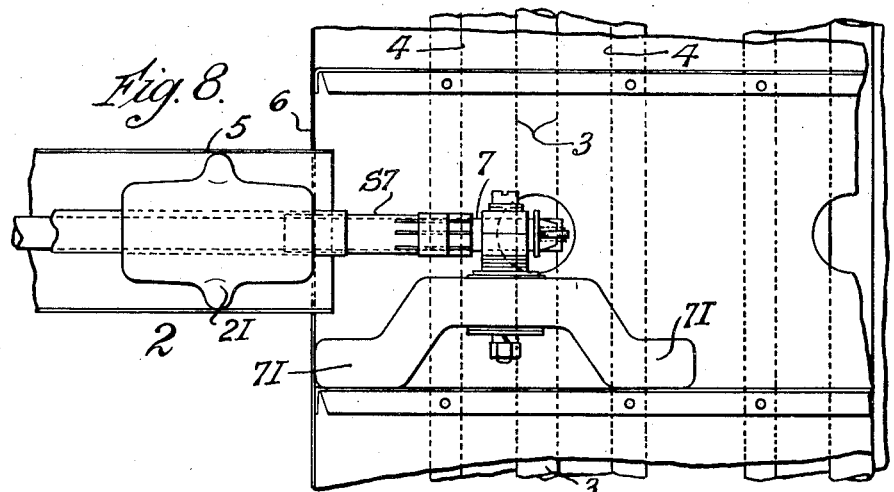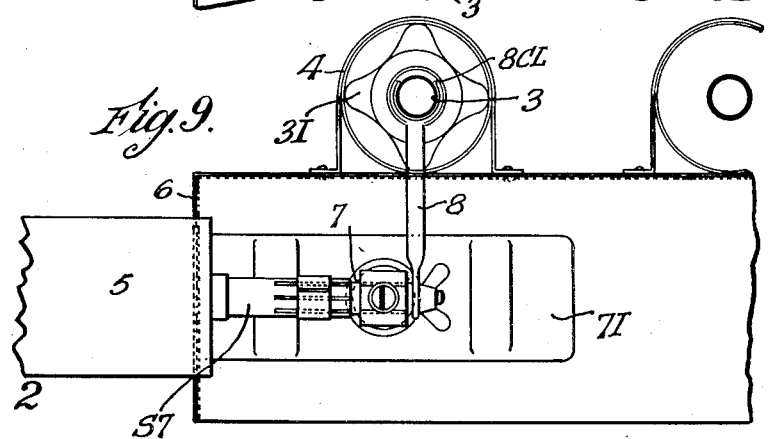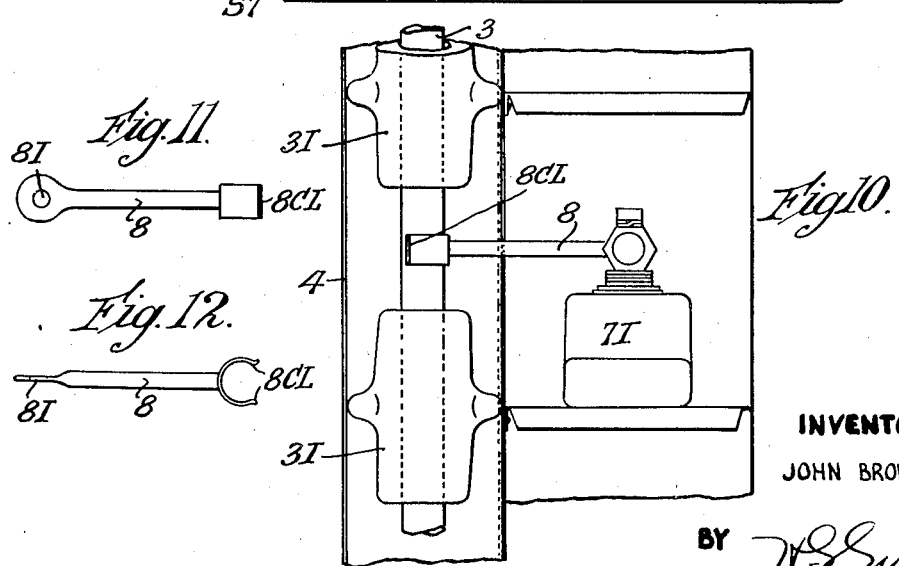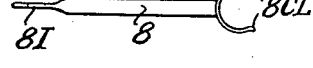

Patented Jan. 1, 1935

1,986,182

UNITED STATES PATENT OFFICE 1,986,182

DISTRIBUTION SYSTEM

John Brown, Somerton, England, assignor to Radio Corporation of America, a corporation of Delaware Application August 27, 1929, Serial No. 388,807
In Great Britain September 5, 1928

2 Claims. (Cl. 250—33)

This invention relates to a distribution system and especially to feeder distribution boxes; and it is particularly applicable for use in connecting receivers to aerials with which are associated feeder systems, e. g. to aerials such as are described in the specification of British Patent No. 284,004.

Any system of aerials, to have complete flexibility, must have its various elements connected to a central point from which position connections can be made to any or all points of reception.

It is also necessary, where the aerial systems in use are some distance from the receiving building and feeders or transmission lines are therefore employed to convey the received energy collected on the aerials, that no reflection or standing waves should take place along these lines or feeders. The connections between the feeders from the aerials and the feeders to the receivers should therefore be such that the normal surge impedance is the same throughout the system. When these connections are made inside a building where interference may be picked up from other electrical apparatus, perfect screening must be provided. Screening between adjacent feeders from different aerials is also necessary to ensure reception solely from the diagram selected.

One of the main objects of the invention is to provide means whereby the aerial and receiver systems are completely screened from each other and can be interconnected in any way which may be desired. The invention is also applicable for connecting receivers to the line wires of a system in which carrier current signalling is employed.

In the accompanying drawings Figure 1 is a front view of a change over box with the leads removed, Figure 2 is an end view, Figure 3 is a plan, Figures 4, 5 and 6 are front, plan and end views respectively of one of the lids embodied in the change over box shown in Figures 1 to 3. Figure 7 is a projection showing schematically a portion of a change over box of the kind shown in Figures 1 to 3. Figures 8, 9 and 10 show in elevation, plan, and end view, an internal arrangement for one set of the various conductors and insulators embodied in the change over box illustrated generally in Figures 1 to 3. Figures 11 and 12 show one of the connectors.

Referring to the drawings, the distribution or change over box comprises a plurality of partitions 1 each parallel to one another, the spaces between the partitions forming compartments into which extend leads generally designated 2 (Figure 8) each from one of a plurality of receivers. Feeders 3 each from a different one of a plurality of aerials are arranged behind the distribution box at right angles to the receiver leads and are enclosed in shields 4 secured to the back of the distribution box. The feeders 3 are tubular and are carried within shields 4 by insulators 3I which make contact with the shields 4 over only a small area so that the dielectric spacing between a feeder tube 3 and its appropriate screen 4 is largely air. The receiver leads are also located within tubes, such as 5 (Figure 8), let into apertures in the side 6 of the distribution box and are provided each with a telescopic inner tube 7 adapted to slide in a fixed sleeve S7 the extreme end of each telescopic tube being supported by an insulator 7I which is not secured to the box but is free to slide along the appropriate partition. Each telescopic tube is provided with a connector 8 (Figure 10) adapted to make contact with any desired aerial feeder tube 3 the back of the distributor box being provided with apertures 9 (Figure 7) to permit the connector to pass through. Screening covers SC9 (Figure 1) are provided for covering those apertures 9 which are not being used. As will be seen the connectors 8 are formed with an eyelet 8I for making connection to the appropriate receiver tube and with a spring clamp 8CL (Figures 11 and 12) for making connection with an appropriate aerial tube. The sleeved portion S7 of a receiver connector 2 is held within the screening tube 5 by means of insulators, such as 2I similar to the insulators 3I. The front of the distributor box is provided with hinged lids the construction of which is illustrated in Figures 4 to 6 whereby each compartment can be closed and screened. A lid is indicated at L in Figure 7 the hinged bead being shown at HB and the cooperating lid bead being shown at LB. The lid is adapted to be fastened by a hook H engaging with a member such as M sweated to the box. Where it is desired to connect one receiver to more than one aerial two connectors such as 8 may be used between the telescopic tube, such as 7 and the respective aerial feeders i. e. in such a case an insulator 7I would be slid along the appropriate partition and a number of connectors 8 connected to the extended telescopic tube 7 each connector passing through a hole 9 to one of the aerial tubes.

It will be seen that in this distributor box, all the receiver leads can, if desired, be connected to a single aerial system, or each receiver lead can, if desired, be connected to a separate aerial system.

When it is desired to connect one receiver to more than one aerial (or to both halves of a split aerial), two connectors may be used between the telescopic tube and the respective aerial feeders.

Preferably means are provided whereby any section of an aerial feeder not connected to a receiver feeder, i. e. a "dead end", may be disconnected. These means may take various forms; for example, the back of the distribution box may be provided with hinged doors, the feeder lengths within the box being divided into sections and the arrangement being such that the "dead end" may be disconnected by sliding a conductive sleeve which normally connects the said "dead end" to the incoming feeder. As a modification, the aerial feeders may be formed telescopically as are the receiver leads in the arrangement illustrated; in this modification the back of the distribution box would resemble the front except that corresponding parts would lie at right angles to one another.

The distributor box lends itself (where many beam aerial systems directional in various directions are in use) to a measure of diagram rotation, by choosing suitable aerials. This latter is very useful when, owing to transitory etheric conditions, the direction of reception is apparently unstable.

The box also ensures that no coupling shall exist within the box between any aerials or between receiver leads by way of the aerial feeder connections when this condition of total independence is desired.

What I claim is:

1. In combination, a plurality of leads adapted to be connected to aerials, a plurality of other leads adapted to be connected to high frequency apparatus, and a distribution box suitable for use in interconnecting any one of said aerial leads with any one of the high frequency apparatus leads comprising a plurality of screening compartments adapted to retain one set of the leads to be connected, a hinged lid on the outside of each of said compartments for providing access to said leads therein, and shielding compartments for retaining the other set of leads outside said screening compartments and at an angular relationship with respect to the leads in said screening compartments, and metallic connecting links adapted to pass through apertures in the screening compartments, said links having terminals arranged to contact with said leads for electrically coupling together any desired leads in one set with desired leads in the other.

2. A high frequency distribution box for connecting leads to receiving antennae and leads to receiving apparatus comprising a plurality of screening compartments arranged in box-like form, said compartments adapted to retain the leads to said receiving apparatus, means comprising shielded passages running substantially at right angles to the length of the compartments attached to said compartments for containing the leads to said antennae, connecting links adapted to pass through apertures in the compartments and coupling together certain of said first mentioned leads to certain of the second mentioned leads for enabling said leads to the receiving apparatus to be connected to any of said leads to the antennae through said apertures in said compartments, and said compartment leads comprising adjustable means having telescopic tubes for variation in the length thereof.

JOHN BROWN.